United States Patent
Hansen et al.

(10) Patent No.: US 11,986,371 B2
(45) Date of Patent: May 21, 2024

(54) CUSTOM TOOL FOR BONDING ORTHODONTIC APPLIANCES, AND METHODS OF DESIGNING AND USING CUSTOM TOOLS

(71) Applicant: Solventum Intellectual Properties Company, Maplewood, MN (US)

(72) Inventors: James D. Hansen, White Bear Lake, MN (US); Joseph C. Dingeldein, Hudson, WI (US); John M. Pilgrim, Woodbury, MN (US)

(73) Assignee: 3M Innovative Properties Company

( * ) Notice: Subject to any disclaimer, the term of this patent is extended or adjusted under 35 U.S.C. 154(b) by 0 days.

(21) Appl. No.: 17/784,240

(22) PCT Filed: Dec. 16, 2020

(86) PCT No.: PCT/IB2020/062063
§ 371 (c)(1),
(2) Date: Jun. 10, 2022

(87) PCT Pub. No.: WO2021/130614
PCT Pub. Date: Jul. 1, 2021

(65) Prior Publication Data
US 2023/0042808 A1    Feb. 9, 2023

Related U.S. Application Data

(60) Provisional application No. 62/952,792, filed on Dec. 23, 2019.

(51) Int. Cl.
*A61C 7/14*    (2006.01)
*B33Y 80/00*    (2015.01)

(52) U.S. Cl.
CPC ............... *A61C 7/146* (2013.01); *B33Y 80/00* (2014.12)

(58) Field of Classification Search
CPC .......................... A61C 7/12–146; B33Y 80/00
See application file for complete search history.

(56) References Cited

U.S. PATENT DOCUMENTS

| 3,482,314 A | 12/1969 | Tofflemire |
| 4,775,320 A | 10/1988 | Marshall et al. |

(Continued)

FOREIGN PATENT DOCUMENTS

| JP | 2002102256 A | 4/2002 |
| JP | 2019208826 A | 12/2019 |

(Continued)

OTHER PUBLICATIONS

International Search Report for PCT Application No. PCT/IB2020/062031 dated Feb. 23, 2021, 5 pages.

(Continued)

*Primary Examiner* — Yogesh P Patel
(74) *Attorney, Agent, or Firm* — Kevin Weber

(57) ABSTRACT

A custom tool for bonding orthodontic appliances in a mouth of a patient, the custom tool comprising: a facial body for a patient-specific, customized fit with the facial side of a plurality of teeth of the patient, a lingual body for a patient-specific, customized fit with the lingual side of the plurality of the teeth of the patient, wherein the lingual body. wherein the facial body and lingual body are configured to combine with the teeth of the patient to position orthodontic appliances on the plurality of teeth.

14 Claims, 7 Drawing Sheets

(56) References Cited

U.S. PATENT DOCUMENTS

| | | | |
|---|---|---|---|
| 5,382,160 | A | 1/1995 | Shemet |
| 5,803,734 | A | 9/1998 | Knutson |
| 6,174,163 | B1 | 1/2001 | Hiro |
| 6,435,871 | B1 | 8/2002 | Inman |
| 6,739,869 | B1 | 5/2004 | Taub et al. |
| 7,210,929 | B2 | 5/2007 | Raby et al. |
| 7,217,131 | B2 | 5/2007 | Vuillemot |
| 7,354,268 | B2 | 4/2008 | Raby et al. |
| 7,442,040 | B2 | 10/2008 | Kuo |
| 7,940,258 | B2 | 5/2011 | Stark et al. |
| 7,993,133 | B2 | 8/2011 | Cinader, Jr. et al. |
| 8,366,445 | B2 | 2/2013 | Vullemot |
| 8,393,897 | B2 | 3/2013 | Clark |
| 8,517,727 | B2 | 8/2013 | Raby et al. |
| 8,753,114 | B2 | 6/2014 | Vuillemot |
| 9,308,058 | B2 | 4/2016 | Clark |
| 9,375,290 | B2 | 6/2016 | Csapo et al. |
| 9,414,895 | B2 | 8/2016 | Clark |
| 9,763,750 | B2 | 9/2017 | Kim et al. |
| 2004/0157184 | A1 | 8/2004 | Reising |
| 2005/0089814 | A1 | 4/2005 | Slone |
| 2007/0275340 | A1 | 11/2007 | Kopelman et al. |
| 2010/0092904 | A1 | 4/2010 | Esposti et al. |
| 2010/0159412 | A1 | 6/2010 | Moss et al. |
| 2014/0349241 | A1 | 11/2014 | Okazaki |
| 2016/0074139 | A1 | 3/2016 | Machata et al. |
| 2016/0166357 | A1 | 6/2016 | Portalupi |
| 2017/0105816 | A1 | 4/2017 | Ward |
| 2018/0021113 | A1* | 1/2018 | Hansen ............... A61C 13/0004 433/213 |
| 2018/0344431 | A1 | 12/2018 | Kuo et al. |
| 2019/0142551 | A1 | 5/2019 | Dickenson et al. |

FOREIGN PATENT DOCUMENTS

| | | | |
|---|---|---|---|
| WO | 2001080761 | A2 | 11/2001 |
| WO | 2008115657 | A1 | 9/2008 |
| WO | 2014093084 | A1 | 6/2014 |
| WO | 2016094272 | A1 | 6/2016 |
| WO | 2017106419 | A1 | 6/2017 |
| WO | 2017106431 | A1 | 6/2017 |
| WO | 2018022616 | A1 | 2/2018 |
| WO | 2018022617 | A1 | 2/2018 |
| WO | WO-2018022617 | A1 * | 2/2018 ......... A61C 13/0001 |
| WO | 2020033528 | A1 | 2/2020 |
| WO | 2020033532 | A1 | 2/2020 |
| WO | 2021130611 | A1 | 7/2021 |

OTHER PUBLICATIONS

International Search Report for PCT Application No. PCT/IB2020/062063 dated Mar. 2, 2021, 5 pages.

* cited by examiner

CUSTOM TOOL FOR BONDING ORTHODONTIC APPLIANCES, AND METHODS OF DESIGNING AND USING CUSTOM TOOLS

CROSS REFERENCE TO RELATED APPLICATIONS

This application is a national stage filing under 35 U.S.C. 371 of PCT/IB2020/062063, filed Dec. 16, 2020, which claims the benefit of U.S. application Ser. No. 62/952,792, filed Dec. 23, 2019, the disclosures of which are incorporated by reference in their entireties herein.

BACKGROUND

Orthodontic appliances such as brackets are used in orthodontic treatments for moving one or more teeth from an initial position (sometimes referred to as malposition or malocclusion) to a desired position in a patient's dentition. For example, by using an orthodontic treatment the patient's tooth may be moved such that their labial sides are aligned with each other to achieve or maximize an aesthetically pleasant appearance of the overall dentition. Further in some cases, one or more teeth may be moved to correct a malocclusion. The movement of teeth is typically achieved by a pre-biased elastic arch wire, which is attached via brackets to the teeth, and which applies a force to the teeth toward the desired position over a longer time period. The ends of orthodontic arch wires are often connected to small appliances known as buccal tubes that are, in turn, secured to the patient's molar teeth. In many instances, a set of brackets, buccal tubes and an arch wire is provided for each of the upper and lower dental arches of the patient.

In many types of orthodontic techniques, the precise position of the orthodontic appliances on the teeth is an important factor for helping to ensure that the teeth move to their intended final positions. For example, one common type of orthodontic treatment technique is known as the "straight-wire" technique, where the arch wire lies in a horizontal plane at the conclusion of treatment. If, for example, a bracket is attached to the tooth at a location that is too close to the occlusal or outer tip of the tooth, the orthodontist using a straight-wire technique will likely find that the tooth in its final position is unduly intruded. On the other hand, if the bracket is attached to the tooth at a location closer to the gingiva than is appropriate, it is likely that the final position of the tooth will be more extruded than desired.

Certain treatment planning systems have been used to determine the desired position of the teeth in a computer simulation in advance of any actual treatment. Such a planning system helps for example for avoiding collisions between the teeth and brackets in tooth positions outside the initial position, and further allows for the brackets and the arch wire to be designed and arranged to match with a variety of clinical situations, for example with the position of the teeth in the initial position, in the desired position, and positions between. For lingual brackets, such treatment planning is widely used. Lingual brackets often have a customized design individually for every tooth and patient because, other than the labial surfaces of a tooth, the lingual surfaces greatly vary in shape relative to each other so that a "one size fits all" bracket shape typically cannot be used. Some treatment planning systems also allow for designing such customized brackets which precisely match a tooth surface and the required clinical situations of a patient.

Accordingly, customized brackets typically have to be precisely placed at positions on the teeth which are predetermined during the treatment planning For facilitating a precise placement of the brackets on a patient's teeth and for the orthodontist's reference, the brackets are often provided prepositioned on a plaster model replicating the patient's teeth. One example of a treatment planning software is disclosed in PCT Publication WO 2001/80761 "Interactive Orthodontic Care System Based on Intra-oral Scanning of Teeth." As disclosed, the treatment planning software virtually superimposes brackets on teeth to generate a three-dimensional model comprising the three-dimensional tooth objects plus the virtual brackets at their intended locations. This three-dimensional model is supplied to a stereolithography (SLA) instrument for additive manufacturing a plastic model of the teeth with the brackets superimposed thereon. A thermoplastic foil is placed above the SLA model and the model and foil are placed within a pressure chamber. The chamber is pressurized so that the foil envelops the dentition and the brackets. The foil thus obtains small indentations where the brackets can be located.

A plaster model on which the brackets are placed is sometimes used in orthodontics to make a so-called "transfer tray" for facilitating the placement of the bracket on a patient's teeth. A transfer tray typically is adapted to hold a complete set of brackets at the predetermined position and allow the brackets to be placed and bonded on the teeth all at once, in one step, during "indirect bonding."

In general, indirect bonding techniques involved the use of a transfer tray having a shape that matches the configuration of at least part of a patient's dental arch. A set of orthodontic appliances such as brackets are releasably connected to the tray at certain, predetermined locations. Adhesive is applied to the base of each appliance, and the tray is then placed over the patient's teeth until the adhesive hardens. Next, the tray is detached from the teeth as well as from the appliances, with the result that all the appliances previously connected to the tray are now bonded to the respective teeth at their intended, predetermined locations. One example of a method of making a transfer tray for orthodontic appliances is disclosed in published European Patent Application No. 1 2196 586, "Mockup Representing a Dental Arch Including Analogs Approximating Orthodontic Brackets and Method of Making the Mockup." Another example of a method of making a transfer tray for orthodontic appliances is disclosed in U.S. Pat. No. 9,763,750 "Rapid Prototyped Transfer Tray for Orthodontic Appliances."

Although certain advances have been made in methods of predetermining locations of orthodontic appliances on a patient's teeth and tools for placement thereof, additional advancements are desired by orthodontists and their patients.

SUMMARY

This disclosure relates to custom tools for bonding orthodontic appliances in a mouth of a patient, techniques for producing such custom tools and methods for dental restoration, and methods of bonding orthodontic appliances in a mouth of a patient.

In one example, the disclosure is directed to a custom tool for bonding orthodontic appliances in a mouth of a patient. The custom tool comprises: a facial body for a patient-specific, customized fit with the facial side of a plurality of teeth of the patient, wherein the facial body includes an appliance positioning portion and a first engagement portion extending away from the appliance positioning portion; a lingual body for a patient-specific, customized fit with the lingual side of the plurality of the teeth of the patient, wherein the lingual body includes a first engagement portion; wherein the first engagement portion of the facial body interlocks with the first engagement portion of the lingual body; and wherein the facial body and lingual body are configured to combine with the teeth of the patient to position orthodontic appliances on the plurality of teeth.

In another example, the disclosure is directed to a method of bonding orthodontic appliances in a mouth of a patient. The method comprises: positioning a patient-specific lingual body adjacent a plurality of teeth of a patient to receive orthodontic appliances, wherein the lingual body has customized fit with the lingual side of the teeth of the patient, wherein the lingual body includes a first engagement portion, and; positioning a patient-specific facial body adjacent the plurality of teeth, wherein the facial body has a customized fit with the facial side of the teeth of the patient, a first engagement portion, and a plurality of receptacles each holding an orthodontic appliance aligned with the plurality of teeth; interlocking the first engagement portion of the facial body with the first engagement portion of the lingual body to combine with the teeth of the patient to position the orthodontic appliances on the plurality of teeth; bonding the orthodontic appliances to the teeth; and removing the facial and lingual bodies from plurality of teeth.

In yet a further example, this disclosure is directed to a method of designing a custom tool for bonding orthodontic appliances in a mouth of a patient. The method comprises: receiving, by one or more processors, three-dimensional scan data including supragingival tooth structure of a patient; designing, by the one or more processors, a custom tool for precise placement of orthodontic appliances on the patient's teeth based on the three-dimensional scan data of the supragingival tooth structure of the patient; designing, by the one or more processors, the orthodontic appliance receptacles to provide desired location and orientation of orthodontic appliances on the tooth structure of the patient; wherein the tool comprises: a facial body for a patient-specific, customized fit with the facial side of a plurality of teeth of the patient, wherein the facial body includes an orthodontic appliance positioning portion and a first engagement portion extending away from the positioning portion; a lingual body for a patient-specific, customized fit with the lingual side of the plurality of teeth of the patient, wherein the lingual body includes a first engagement portion extending away from the custom fitting portion; wherein the first engagement portion of the facial body interlocks with the first engagement portion of the lingual body; and wherein the facial body and lingual body are configured to combine with the teeth of the patient to position orthodontic appliances on the plurality of teeth.

Figure 1:
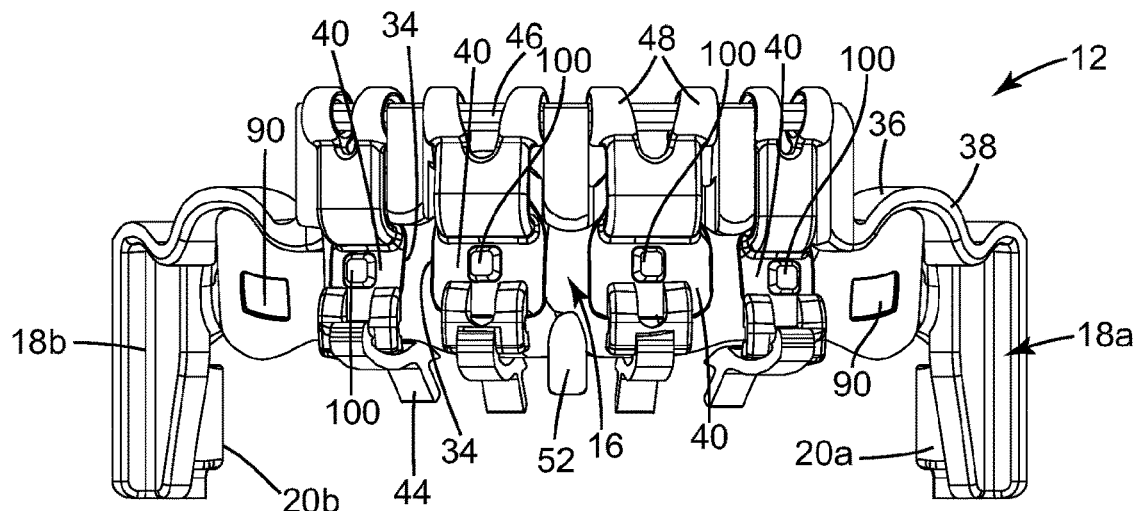
FIG. 1 is a front view of an embodiment of a facial body that may be a part of a custom tool for bonding orthodontic appliances.

The following embodiments are intended to be illustrative of the present disclosure and not limiting.

DETAILED DESCRIPTION

The primary objective of orthodontics is to move a patient's teeth to a position where the teeth are in proper function and esthetically pleasing. Orthodontic treatment may include standardized brackets and wires, such as those components in a "straight-wire" appliance system. Conventional orthodontic appliances such as brackets are positioned by hand by an orthodontist in defined positions and orientations according to standardized placement rules. The orthodontist may also visually gauge proper bracket positions and imagining treatment outcomes. After placement is determined, the brackets are then bonded by a small quantity of adhesive placed on the base of each bracket. The bracket may be bonded to the tooth using either a two-part chemical cure adhesive or a one-part light-cure adhesive. The uncured adhesive is sufficiently viscous and tacky to allow temporary adhesion and visual adjustment prior to final bonding. This method of bracket placement is known as "direct bonding." To save time and ease of handling, some brackets are offered as Adhesive Pre-Coated (APC) commercially available from 3M Company, St. Paul, Minn., which include uncured adhesive on the bracket bases when they come from the factory. Once the orthodontic appliances are bonded on the teeth, the combination of the arch wire and orthodontic appliances adjusted over time move the teeth towards their intended final position.

A skilled orthodontist may become very good at visually gauging proper bracket positions and imagining treatment outcomes for patients. However, it can take many years to acquire this skill, and even then, manual wire bends and bracket repositioning may be needed later in treatment to correct minor placement errors and achieve better results.

The present invention provides custom tools for direct bonding orthodontic appliances. These custom tools are formed using virtual treatment planning software often used in the indirect bonding process to provide accurate bracket placement, but include the advantage of direct bonding the appliances normally to the teeth surface, which provides good bond reliability. One possible disadvantage of indirect bonding is that the orthodontic appliance slides over the facial or lingual surface of the tooth in an occluso-gingival direction, thus smearing or wiping adhesive off the bracket base before coming to rest in its target position on the tooth. This may result in a poor bond between the orthodontic appliance and the tooth, requiring rebonding or replacements, ineffective treatment, or unintentionally consumed appliances. Another disadvantage of indirect bonding is that it requires either the delicate additional step of preloading the orthodontic appliances into the transfer tray in such a way that they are releasably connected to the tray at certain, predetermined locations, or creation of a physical model of the patient's dentition, application of the brackets to the model and creation of the indirect bonding template on the model. Either way, these are time consuming and technique sensitive procedures.

The dental custom tools of the present invention do not have the disadvantages of the indirect bonding tray and placement procedure. The custom tools of the present invention also provide more accurate placement of the orthodontic appliances, including more accurate measurement and analysis in comparison to direct bonding by hand. In addition, the custom tools and use thereof provides reduced doctor/patient time in the chair and better treatment outcomes. In fact, the orthodontist may be able to delegate the procedure for bonding the orthodontic appliances to another sufficiently qualified staff member because the planning of the position of each appliance is removed from the chairside procedure.

Although the custom tools of the present invention do not allow for placement and bonding of the orthodontic appliances all at once, like indirect bonding procedures and templates, they allow for greater control over adhesive delivery because the orthodontic appliances are bonded one at a time, instead of all at once. For example, the custom tools provide greater control over the finer aspects of orthodontic placement, such as controlling of the potential excess of filled adhesive (i.e., flash) from around the base's perimeter and forming a smooth film of adhesive between the base and the tooth. Also, if a bracket is lost or damaged by the patient, it can be easily re-bonded using the original custom tool with a new bracket.

In addition, compared to indirect bonding trays and placement procedures, the custom tools of the present invention provide greater visibility to more easily determine if the template and/or the brackets are positioned correctly on the teeth. This is because there is less material obscuring the brackets in visual reference to the teeth. Also, some indirect bonding trays, such as those formed from silicone, may be damaged after a single use due to the sharp undercut features of the brackets (e.g. hooks & tie-wings) tearing the bracket receptacles as the tray is removed after bonding. In other words, such trays can be damaged by a single use. This can potentially render the tray unable to hold brackets accurately in their intended positions when used to subsequently re-bond brackets due to bond failure or loss during treatment. In contrast, the custom tools of the present invention are reusable, providing the option to rebond certain brackets using the same custom tool template. Lastly, the custom tools may be digitally designed and printed using additive manufacturing to provide a patient-specific, customized tools.

The primary objective of orthodontics is to move a patient's teeth to a position where the teeth are in proper function and esthetically pleasing. Orthodontic treatment may include standardized brackets and wires, such as those components in a "straight-wire" appliance system. Conventional orthodontic appliances such as brackets are positioned by hand by an orthodontist in defined positions and orientations according to standardized placement rules. The orthodontist may also visually gauge proper bracket positions and imagining treatment outcomes. After placement is determined, the brackets are then bonded by a small quantity of adhesive placed on the base of each bracket. The bracket may be bonded to the tooth using either a two-part chemical cure adhesive or a one-part light-cure adhesive. The uncured adhesive is sufficiently viscous and tacky to allow temporary adhesion and visual adjustment prior to final bonding. This method of bracket placement is known as "direct bonding." To save time and ease of handling, some brackets are offered as Adhesive Pre-Coated (APC) commercially available from 3M Company, St. Paul, Minn., which include uncured adhesive on the bracket bases when they come from the factory. Once the orthodontic appliances are bonded on the teeth, the combination of the arch wire and appliances adjusted over time move the teeth towards their intended final position.

A skilled orthodontist may become very good at visually gauging proper bracket positions and imagining treatment outcomes for patients. However, it can take many years to acquire this skill, and even then, manual wire bends and bracket repositioning may be needed later in treatment to correct minor placement errors and achieve better results.

The present invention provides custom tools for bonding orthodontic appliances. All the orthodontic appliances may be applied at once, sequentially, or one at a time to the patient's teeth. These dental template are formed using virtual treatment planning software often used in the indirect bonding process to provide accurate bracket placement, but include the advantage of direct bonding the appliances normally to the teeth surface, which provides good bond reliability.

One possible disadvantage of indirect bonding is that the orthodontic appliance slides over the facial or lingual surface of the tooth in an occluso-gingival direction, thus smearing or wiping adhesive off the bracket base before coming to rest in its target position on the tooth. This may result in a poor bond between the orthodontic appliance and the tooth, requiring rebonding or replacements, ineffective treatment, or unintentionally consumed appliances. Another disadvantage of indirect bonding is that it requires the either delicate additional step of preloading the orthodontic appliances into the transfer tray in such a way that they are releasably connected to the tray at certain, predetermined locations, or creation of a physical model of the patient's dentition, placement of the brackets on the model and creation of the indirect bonding template on the model. Either way, these are time consuming and technique sensitive procedures.

The custom tool for bonding orthodontic appliances of the present invention does not have the disadvantages of the indirect bonding tray and placement procedure. The custom tools of the present invention also provide more accurate placement of the orthodontic appliances, including more accurate measurement and analysis in comparison to direct bonding by hand. In addition, the custom tools and use thereof provides reduced doctor/patient time in the chair and better treatment outcomes. In fact, the orthodontist may be able to delegate the procedure for bonding the orthodontic appliances to another sufficiently qualified staff member because the planning of the position of each appliance is removed from the chairside procedure.

The custom tools of the present invention may be reusable for the same patient, providing the option to rebond certain brackets using the same custom tools. For example, the bracket can be easily rebonded if the initial attempt fails. For rebonding later in treatment after tooth movement has begun, the template can be sectioned to allow an individual bracket to be rebonded using reference features (e.g. occlusal surface) of the individual tooth. In addition, the present invention allows the bracket to approach the tooth from a direction substantially perpendicular to the facial surface of the tooth, eliminating the problem of sliding adhesive across the facial surface of the tooth prior to curing. The digitally designed custom tool also allows brackets to be placed precisely on the teeth with a nonuniform adhesive thickness (e g thinner on mesial than distal) that can be useful when customizing treatment for a patient using non-custom appliances.

The custom tools described herein may include features designed to provide interferences between the two primary portions of the tool and certain engagement portions which interlock, which overall helps with preventing relative movement between the portions in multiple directions, helps with better clamping of the tool to the orthodontic patient's teeth and for positioning the two portions together to precisely locate orthodontic appliances on the patient's teeth at predetermined locations and orientations. Such interferences are digitally designed into the custom body is when it is designed and produced. Traditional dental tool bodies do not have digitally designed interferences. In order to interlock together or separate the two portions from each other, they may need to deform or bend. In addition, the tools described herein may eliminate the need for external tools, and are instead self-contained and thus, quicker and simpler to install on a patient's teeth. In addition, captive doors provide a reduction of individual parts that need to be assembled, and decreasing the likelihood of losing individual parts. Lastly, the tools described herein provide more precise control over the placement and bonding of orthodontic appliances on the patient's teeth at predetermined locations and at predetermined orientations compared to practitioners using more traditional skills, tools and techniques.

Each custom tool 10 is custom designed to fit a certain patient ("patient specific"), and thus has a customized fit with a plurality of teeth 72 in the patient's dental arch. The custom tool is specially designed to register and fit onto a specific patient's dental arch. To achieve this, the custom tool described herein may be digitally designed. For example, a tool may be designed using a three-dimensional (3D) model of the patient's tooth structure (e.g., obtained from an intraoral scan of all or part of the patient's dentition or scanning of a conventional impression or model). The tool can be, for example, manufactured from the digital data using an additive technique, such as 3D printing, or a subtractive technique, such as CAD/CAM milling.

The disclosed techniques help facilitate high quality orthodontic appliance bonding to the patient's teeth with improved precision, reduced time and/or skill requirements, compared to conventional bonding techniques.

Figure 2:
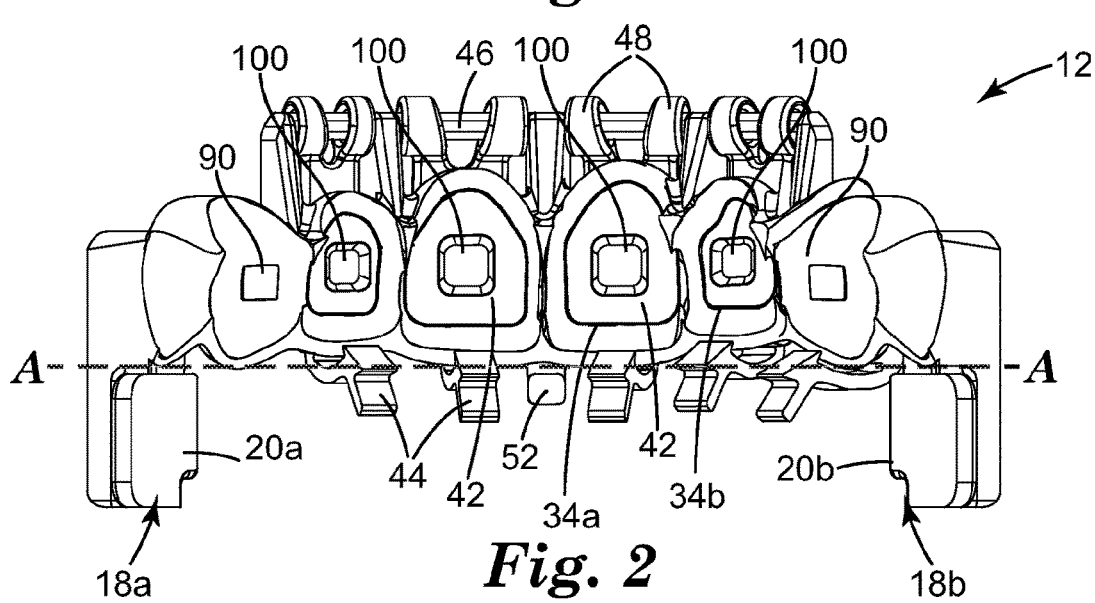
FIG. 2 is a back view of the facial body of FIG. 1.
Figure 3:
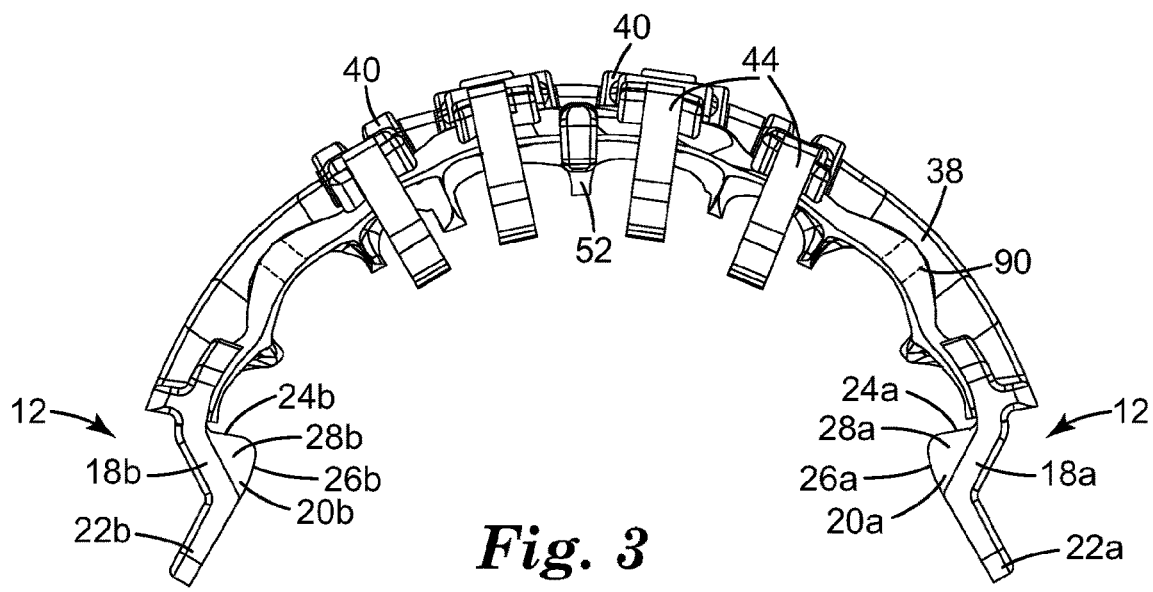
FIG. 3 is bottom view of the facial body of FIG. 1.
Figure 4:
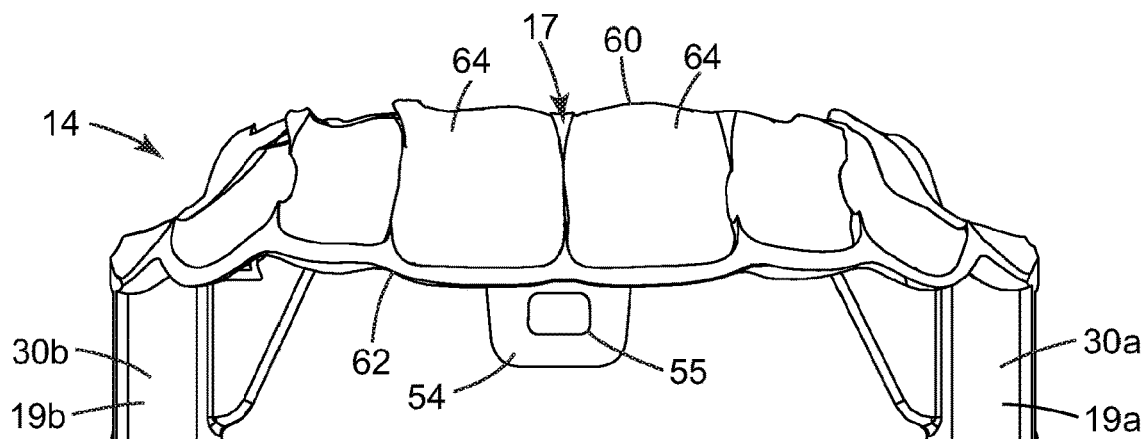
FIG. 4 is a front view of an embodiment of a lingual body that may be a part of a custom tool for bonding orthodontic appliances.
Figure 5:
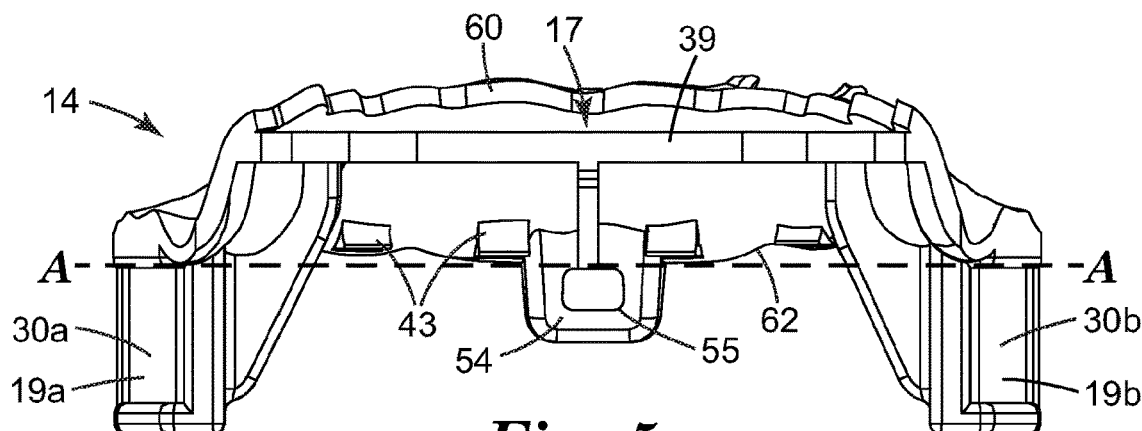
FIG. 5 is a back view of the lingual body of FIG. 4.
Figure 6:
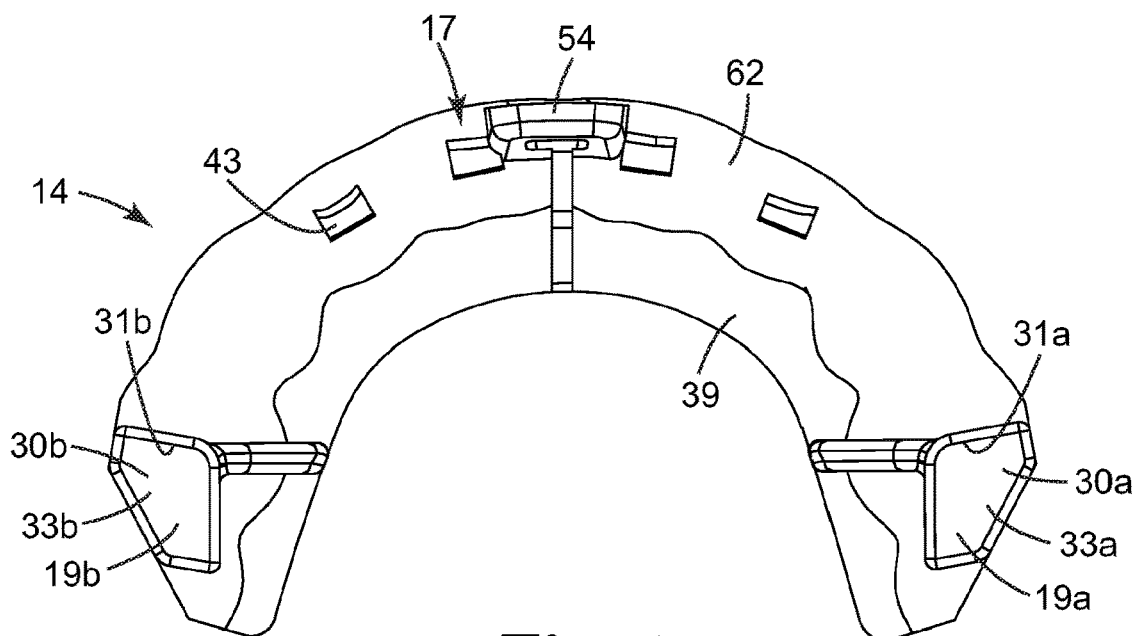
FIG. 6 is a bottom view of the lingual body of FIG. 4.

FIGS. 1, 2, and 3 illustrate an embodiment of a facial portion 12 of the custom tool 10 of the present invention. FIGS. 4, 5, and 6 illustrate an embodiment of a lingual portion 14 of the custom tool 10 of the present invention. "Facial" as used herein, including the claims, refers to the direction directed toward the cheeks or lips (i.e., the buccal and labial) of the patient, and opposite the lingual direction. "Lingual" as used herein, including the claims, refers to the direction directed toward the tongue of the patient, and opposite the facial direction. FIGS. 7, 8a, 8b, and 9 illustrate how the facial and lingual portions 12, 14 fit together to form a complete a patient-specific, custom tool 10 for bonding orthodontic appliances 80.

FIGS. 1-3 are views of one embodiment of the facial body 12 of custom tool 10 for bonding orthodontic appliances 80, such as brackets, in predetermined locations and at predetermined orientations. The tool 10 includes a facial body 12, which may be configured to provide a customized fit with the patient's dental arch. For example, facial body 12 may be specifically designed to fit next to, mate with, the facial surfaces of the patient's teeth. In the example shown in FIG. 1, the facial body 12 includes an appliance positioning portion 16 and an engagement portion 18. A practitioner uses the appliance positioning portion 16 of the custom tool 10 to position and then bond the orthodontic appliances 80 to the teeth in the mouth of the patient. The orthodontic appliances 80 are held in place within specially designed receptacles. The receptacles may be of any form that receive and correctly position the orthodontic appliances on their corresponding teeth in predetermined locations on the teeth and in predetermined orientations relative to the teeth. The Figures illustrate the receptacles in two different embodiments, open receptacles 90 or partially enclosed receptacles 100, but other embodiments may be envisioned by those skilled in the art. Both types of receptacles are explained in more detail below.

In order to place the orthodontic appliances precisely, it is preferable to have a tight fit between the facial body 12, lingual body 14, and the patient's teeth. In certain situations, the facial and lingual bodies may be relieved from full conformance to the teeth to provide access for insertion and to avoid excessive undercuts during application to the mal-occluded teeth. To assist in securing the template to the teeth, there are two engagement portions 18a, 18b positioned at opposite ends of the appliance positioning portion 16. This is ideal, but not necessary. For example, the facial body 12 could include just one engagement portion 18 positioned adjacent the appliance positioning portion 16. However, in custom tools 10 having two engagement portions 18a, 18b, this provides two points of interlock between the lingual and facial bodies 12, 14.

The first engagement portion 18a and second engagement portion 18b both extend away from the appliance positioning portion 16. In the illustrated embodiment, the engagement portions 18 extend at a generally right angle relative to the appliance positioning portion 16. When compared to the patient's mouth, which includes an occlusal plane shown generally by line A-A (in FIG. 2) the engagement portions 18 preferably extend generally perpendicular to such occlusal plane.

The length of the engagement portions 18 may extend some distance from the appliance positioning portion 16 of the facial body 12. The length of the engagement portions 18, 19 may be customized and optimized for the individual patient. If the engagement portions are too long, they will stretch the patient's jaw, making it uncomfortable or painful for the patient. If the engagement portions are too short, the facial body 12 will disengage from the patient's teeth. In one embodiment, the length of the engagement portions may be 1 mm to 5 cm in length. However, it may depend on where exactly the engagement portions are located in the patient's mouth. They may be longer, if they are attached to the patient's teeth near the front of the mouth, such as the incisors. They may be shorter, if they are attached to the back of the mouth, like the molars. Also, the patient's overall opening distance between the upper and lower arches of teeth is a consideration.

As illustrated in FIG. 3, engagement portions 18 of the facial body 12 may include a variety of engagement surfaces configured to mate appropriately with the engagement surfaces on a lingual body 14. Engagement portions 18a, 18b of the facial body 12 may include a protrusion 20a, 20b respectively or some other mechanism known in the art for interlocking with the lingual body 14. in the illustrated embodiment, protrusion 20 includes a first engagement surface 24, a second engagement surface 26, and a third engagement surface 28. Protrusions 20a, 20b are sized and shaped to interlock or snap fit with the indentations 30a, 30b in the lingual body 14. Alternatively, engagement portions 18 of the facial body 12 could include a protrusion on one end and an indentation on the opposite end, and the lingual body 14 could include an indentation on one end and a protrusion on the opposite end, to allow the two bodies 12, 14 to interlock together. Various structures known in the art may be substituted for the protrusion 20 and indentations 30, so long as they assist in securely interlocking the facial body 12 to the lingual body 14. For example, dovetail vertical slides or button and snaps may also be used as interlocking features of the engagement portions.

Figure 7:
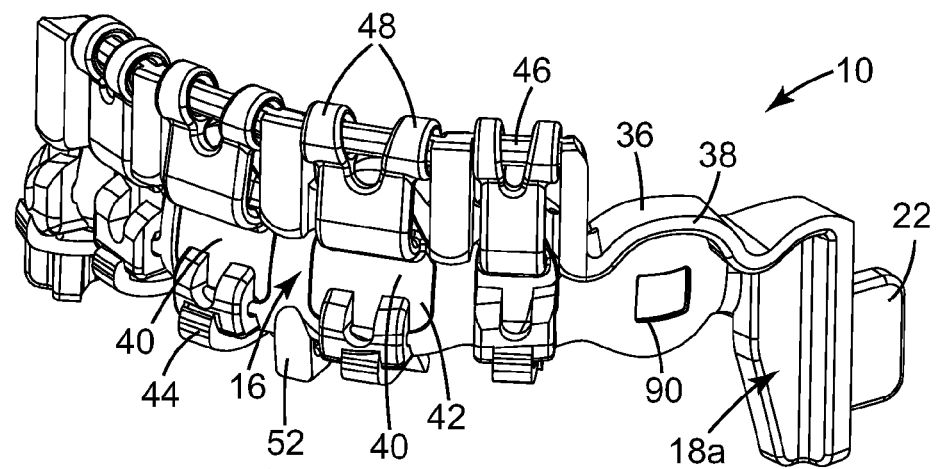
FIG. 7 is a perspective view of the facial body of FIG. 1 and the lingual body of FIG. 4 prior to interlocking them together.
Figure 7:
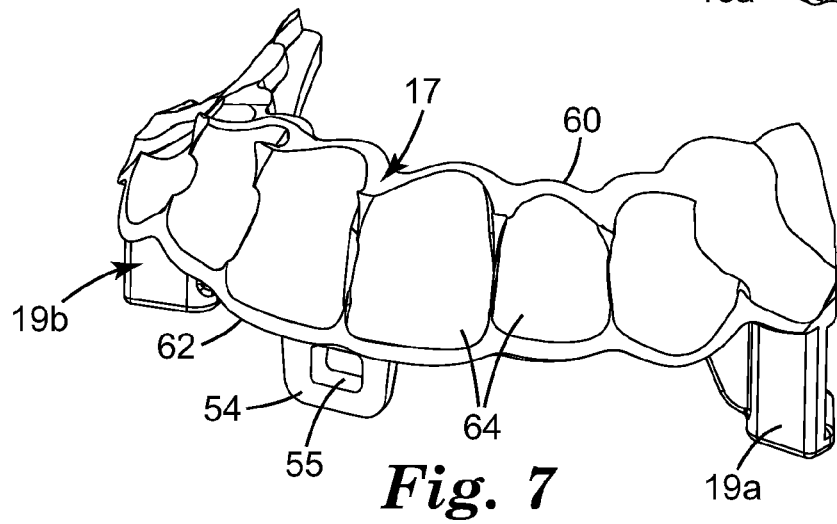

The engagement portions 18a, 18b of the facial body 12 are structured to engage with or interlock with the engagement portions 31, 32, and 33 on the lingual body 14, as explained in more detail below in reference to FIGS. 7, 8, and 9.

In the illustrated embodiment, the appliance positioning portion 16 is sized and shaped to mate with the facial surfaces of the anterior teeth of a patient. The engagement portions 18 are sized and shaped be adjacent to the posterior teeth.

In the example shown in FIG. 1, the facial body 12 includes one or more receptacles, illustrated as either open receptacles 90 (or apertures) or partially enclosed receptacles 100 on doors 40. Each open receptacle 90 is positioned over a portion of a facial surface of a respective tooth of the patient that is to receive an orthodontic appliance. Each of the apertures 34 has a suitable receptacle 100 for receiving and holding an orthodontic appliance 80. When door 40 is mated with a respective aperture 34, the surface 42 of the door 40 and the base 82 of the orthodontic appliance 80 are closely aligned with the surface of the tooth 72 that is to receive an orthodontic appliance. Regardless of which type of receptacle is used, the modeling software is used to design the shape and orientation of the receptacle to assist in aligning the base of the orthodontic appliance 80 at the ideal location on the individual tooth.

The receptacle 90 may include a substantially enclosed perimeter, as illustrated in the Figures. The substantially enclosed perimeter could be sized and shaped to closely outline the base 82 of the specific orthodontic appliance 80 intended for placement therein. Alternatively, the substantially enclosed perimeter could be sized and shaped in a particular segment of the receptacle 90, to help guide the orthodontist to bond the appliance 80 to the correct location on the tooth. For example, the open receptacles 90 may be enlarged (not shown) along one or more edges to allow the brackets clearance as the custom template 10 is removed from the teeth. In this case, the open receptacles 90 could include at least one surface or edge configured to engage an edge feature of the base 82 of the corresponding orthodontic appliance 80. The surfaces or edges of each receptacle help guide the position and orientation of the bracket or orthodontic appliance 80 on the tooth surface, according to the digital treatment plan. Depending on the intended direction of motion of the custom tool 10 during removal after bonding, different edges may be enlarged and by varying shapes and distances so as to avoid interference with the brackets 90.

The facial body 12 may have individual doors 40 each with its own receptacle 100 and all sized to closely fit with corresponding apertures 34. The shape of one or more of apertures 34 for mating with the doors 40 may be designed to substantially match the shape of the tooth. Each door 40 may be attached to the facial body 12 as illustrated with a hinge 48 and hinge pin 46 at one end, and an attachment mechanism 44 at the other end. The attachment mechanism 44 in this case is a clip 44 which is designed to clip over or snap onto an engagement surface 43 (shown in FIGS. 5 and 6) on the lingual body 14. As such, the hinge 48 and hinge pin 46 are adjacent the gingiva of the patient's teeth and the clip 44 and engagement surface 43 are adjacent the occlusal surfaces of the patient's teeth or located proximate an incisal edge of a tooth or teeth. This arrangement is convenient for the clip to snap under the occlusal surfaces or incisal edge of the patient's teeth, spaced away from their tongue. However, in other embodiments not illustrated, their relative positions may be reversed, with the clip 44 and engagement surface 43 adjacent the gingiva of the patient's teeth and hinge 48 and hinge pin 46 adjacent the incisal or occlusal surfaces of the patient's teeth.

In the illustrated embodiment, the door body 40 and facial body 12 are mechanically connected to each other by using a hinge 48 and hinge pin. This configuration helps maintain proper alignment between the door body 40 and corresponding aperture 34 during use of custom tool 10. However, door body 40 and facial body 12 may be connected via a snap hinge, a living hinge, a barrel hinge, a pin joint hinge, or any other suitable type of hinge. Door hinge 48 and hinge pin 46 may be formed separate from the door body 40 and/or facial body 12, or door hinge 48 and hinge pin 46 may be formed as an integral part of door body 40 and/or facial body 12.

The facial body 12 may include a first alignment member 52, which assists in properly aligning the facial and lingual bodies 12, 14 before interlocking them together. In the illustrated embodiment, the first alignment member 52 is a post that is sized to fit with the second alignment member 54 in the lingual body 14, shown as a slot 55 in FIGS. 4-6.

The facial body 12 may include a custom gingival surface 36 that is generally contoured to match the gingiva, but not engaging the gingiva. The facial body 12 may also include a facial rib 38 to provide overall strength to the facial body.

Custom tool 10 may include a lingual body 14, which may also be configured to provide a customized fit the teeth of the patient. FIGS. 4, 5, and 6 illustrate views of one embodiment of the lingual body 14. Facial body 12 and lingual body 14 are configured to combine with the teeth of the patient to correct seat the orthodontic appliances on the patient's teeth. The lingual body 14 is separable from and engageable with the facial body 12, while maintaining the integrity of the respective bodies, through use of their engagement portions 18, 19.

In the example shown in FIGS. 4-6, the lingual body 14 includes a custom fitting portion 17 and an engagement portion 19. An orthodontist uses the custom fitting portion 17 of the custom tool to closely align and engage with the labial surfaces of the patient's teeth. In the illustrated embodiment, there are two engagement portions 19a, 19b positioned at opposite ends of the custom fitting portion 17. This is ideal, but not necessary. For example, the lingual body 14 could include just one engagement portion 19 positioned adjacent the custom fitting portion 17. However, in custom tools 10 having two engagement portions 19a, 19b, this provides two points of interlock between the facial and lingual bodies 12, 14, respectively.

Lingual body 14 includes first engagement portion 19a and second engagement portions 19b. The engagement portions 19a, 19b of the lingual body 14 are structured to engage with or interlock with the engagement portions 18a, 18b on the facial body 12, as explained in more detail below in reference to FIGS. 7, 8, and 9.

The first engagement portion 19a and second engagement portion 19b both extend away from custom fitting portion 17. In the illustrated embodiment, the engagement portions 19 extend at a generally right angle relative to the custom fitting portion 17. When compared to the patient's mouth, which includes an occlusal plane illustrated as reference line A-A (shown in FIG. 6), the engagement portions 19 extend generally perpendicular to the occlusal plane.

As illustrated in FIG. 6, engagement portions 19 of the lingual body 14 may include a variety of engagement surfaces configured to mate appropriately with the engagement surfaces 24, 26, 28 on the facial body 12. Engagement portions 19a, 19b of the lingual body 14 may include an indentation 30a, 30b respectively or some other mechanism known in the art for interlocking with the facial body 12. In the illustrated embodiment, indentation 30 includes a first engagement surface 31, a second engagement surface 32, and a third engagement surface 33. Indentations 30a, 30b are sized and shaped to interlock or snap fit with the protrusions 20a, 20b in the facial body 12. Various structures known in the art may be substituted for the indentations 30 and protrusion 20, so long as they assist in securely interlocking the lingual body 14 to the facial body 12.

In the illustrated embodiment, the custom fitting portion 17 is sized and shaped to mate with the anterior teeth of a patient. The engagement portions 19 are sized and shaped to be adjacent the posterior teeth.

The lingual body 14 includes a plurality of an engagement surfaces 43 adjacent the occlusal surfaces of the patient's teeth or located proximate to the teeth to receive an orthodontic appliance 80. This arrangement is convenient for the clip 44 (shown in FIGS. 1-3) to snap under the occlusal surfaces or incisal edge of the patient's teeth, spaced away from their tongue. However, in other embodiments not illustrated, the engagement surface 43 may instead be adjacent the gingiva of the patient's teeth, with the clip 44 likewise being in a similar position.

The lingual body 14 may include a custom lingual rib 39 to provide additional clamping or mating to the individual patient's mouth.

The lingual body 14 may include a second alignment member 54 sized and shaped to fit with the first alignment member 52. In the illustrated embodiment, the second alignment member 54 may be mesial alignment receptor. Specifically, the second alignment member may be a slot 55 sized to receive the post 52 on the facial body 12.

FIGS. 8a, 8b, 9 and 10 are useful for illustrating how the facial body 12 and lingual body 14 are assembled together and around the teeth of a patient to position the orthodontic appliances 80 within the receptacles 90, 100 of the tool 10 at precise locations on the teeth. One of the major benefits of this design is that once assembled, movement between the facial body and the lingual body is restricted in multiple directions and multiple rotations. As a result, orthodontists are able to more accurately place and bond the orthodontic bracket in ideal locations on the teeth of for their patients.

Figure 8A:
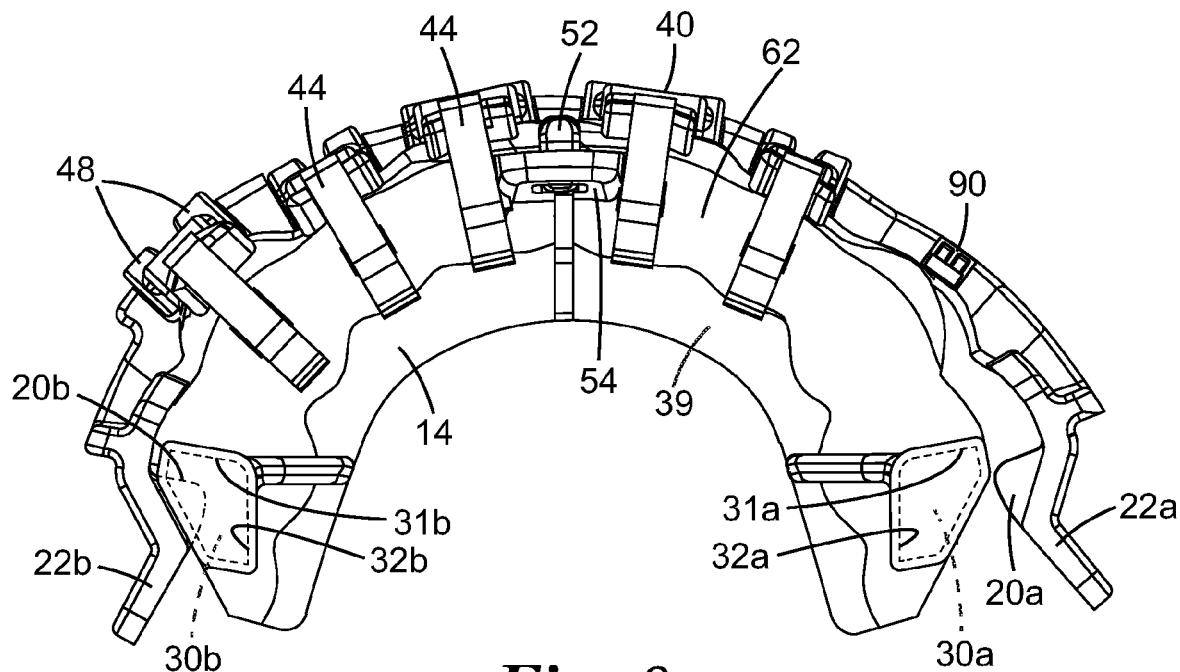
FIGS. 8a and 8b are bottom views convenient for showing how the facial body of FIG. 1 and the lingual body of FIG. 4 may interlock together to form an embodiment of custom tool for bonding orthodontic appliances.
Figure 8B:
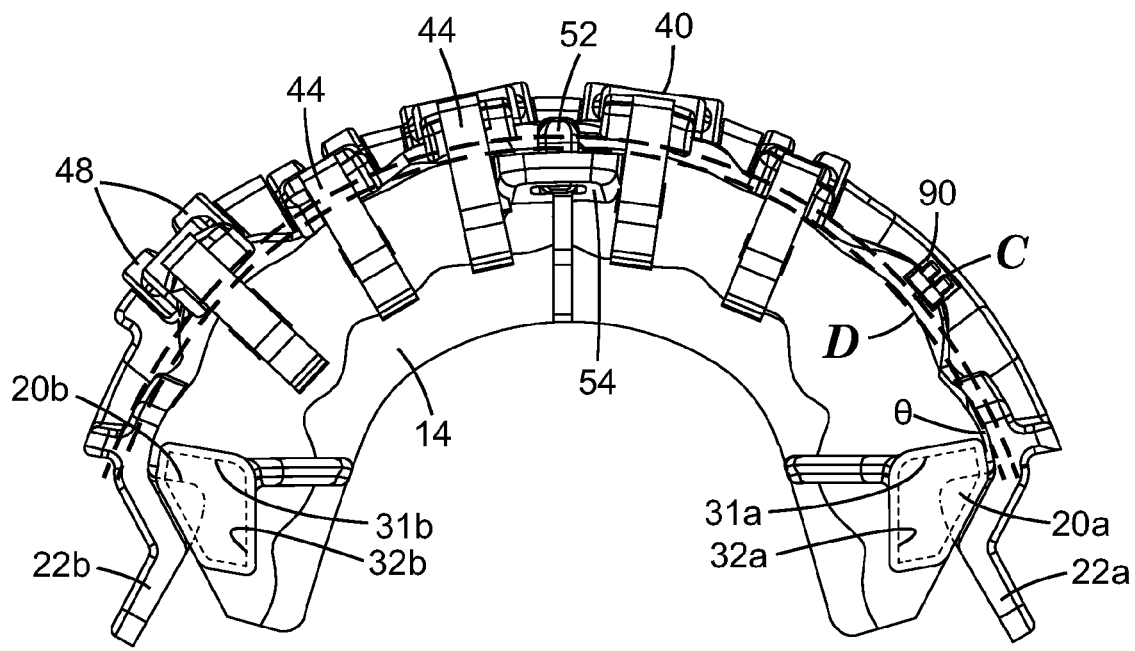

With FIGS. 8a and 8b as a point of reference, an orthodontist may first place the lingual body 14 behind the patient's teeth, with the second alignment member 54 centered adjacent the occlusal surfaces of the patient's teeth. Then, the practitioner may place the facial body 12 over the front of the teeth and align the first alignment member 52, the post, to fit into the second alignment member 54, the hole. However, in other embodiments, bodies 12, 14 could include indicia or alignment features (e.g., visual indicators, other forms of mechanical mating features, keyholes, notches, and the like) to help a practitioner properly align and easily engage facial body 12 and lingual body 14 with one another and with the patient's teeth.

The facial and lingual bodies 12, 14 are preferably made of flexible materials to bend them at certain radiuses to successfully interlock them together, as illustrated in FIGS. 8a and 8b. An orthodontist will interlock the bodies 12, 14 together by placing the protrusions 20a, 20b into the corresponding indentations 30a, 30b. The release tabs 22a, 22b may optionally be used to help fit protrusions 20a, 20b into the indentations 30a, 30b. Custom tools can be made from the full range of 3D printed materials, molded polymeric material or CAD/CAM shaped polymeric materials having certain desired strength, flexibility, translucency, or color. For example, the material can be polymeric material that may be transparent, translucent, or opaque. In some embodiments, clear or substantially transparent polymeric material that may include, for example, one or more of amorphous thermoplastic polymers, semi-crystalline thermoplastic polymers, transparent thermoplastic polymers, and thermoset polymers. Thermoplastics can be chosen from polycarbonate, thermoplastic polyurethane, acrylic, polysulfone, polyprolylene, polypropylene/ethylene copolymer, cyclic olefin polymer/copolymer, poly-4-methyl-1-pentene or polyester/polycarbonate copolymer, styrenic polymeric materials, polyamide, polymethylpentene, polyetheretherketone and combinations thereof. In another embodiment, the body material may be chosen from clear or substantially transparent semi-crystalline thermoplastic, crystalline thermoplastics and composites, such as polyamide, polyethylene terephthalate. polybutylene terephthalate, polyester/polycarbonate copolymer, polyolefin, cyclic olefin polymer, styrenic copolymer, polyetherimide, polyetheretherketone, polyethersulfone, polytrimethylene terephthalate, and mixtures and combinations thereof. In some embodiments, the body is a polymeric material chosen from polyethylene terephthalate, polyethylene terephthalate glycol, poly cyclohexylenedimethylene terephthalate glycol, and mixtures and combinations thereof. In additional embodiments thermoset polymers include acrylics, urethanes, esters, silicones, thiolenes, epoxies, olefin metathesis and combinations thereof. Further, it may be advantageous to coat the fabricated template with a release coating (e.g. parylene) to facilitate easy removal of the template after bonding.

FIG. 8b is convenient for describing the clamping force that can be generated between the facial body 12 and the lingual body 14. The facial body 12 has a certain arch length (C, and the lingual body 14 has a certain arch length (D). When the custom tool 10 is made, the geometry of the facial and/or lingual bodies 12, 14 is altered. For instance, the arch length C of the facial body 12 may be shortened, while the arch length D of the lingual body is maintained, and this configuration creates a clamping force between the two bodes 12, 14 when they are assembled. In addition, the lingual bodies 12, 14 are sufficiently strong so as not to break or buckle, and the protrusion 20 and the indentation 30 can be interlocked without creating undue pressure in the mouth of the patient. Clamping forces can also be generated by slightly reducing the radius of curvature of the facial body 12, while maintaining the radius of curvature of the lingual body 14. Angle 0 illustrates the latching surface relative to the arch tangent.

The degree of clamping force between the facial body 12 and the lingual body 14 should be tailored to balance the security of the installed tool 10 around the patient's teeth and sealing it against the gingival tissues with ease of installation into and removal from the patient's mouth. The degree of clamping force can be increased by increasing the stiffness of the bodies 12, 14 via materials, geometry the amount of shortening of the facial body 12, and/or reduction of the radius of curvature of the facial body 12. Modifications to the bodies 12, 14 can be applied across the bodies, for instance by applying an appropriate shrinkage factor, or they can be applied locally to various regions of the bodies and/or latching mechanism between the two. Latch securement and ease of engagement and removal can be tailored by adjusting the latching angle, length of the latching surfaces (engagement surface) 31 32, 33 and topography of the surfaces 24, 26, 28 to obtain the best balance of performance. Tools such as finite element modeling can be used to predict the appropriate parameters for a given custom tool based on test results of previously tested cases. Machine learning can be applied to improve prediction capability over time, including feedback on clinical performance from practitioners. Digital design and manufacturing, such as 3D printing or CNC machining, is particularly helpful in creating custom tool bodies with active clamping forces.

As illustrated in FIGS. 8a-8b, the orthodontic appliances 80 (illustrated as orthodontic brackets) are already inserted into the receptacles 90 prior to clamping the facial and lingual bodies 12, 14 onto the patient's dental arch. However, the orthodontic appliances 80 could be loaded into the open receptacles 90 after the facial and lingual bodies 12, 14 are on the patient's teeth. Likewise, the receptacles 90 could be preloaded with the intended orthodontic appliances 80 prior to clamping the facial and lingual bodies 12, 14 onto the patient's dental arch. Or, after the facial and lingual bodies 12, 14 are clamped onto the patient's teeth, the orthodontist may open each door 40 and place an orthodontic appliance 80 therein.

Figure 9:
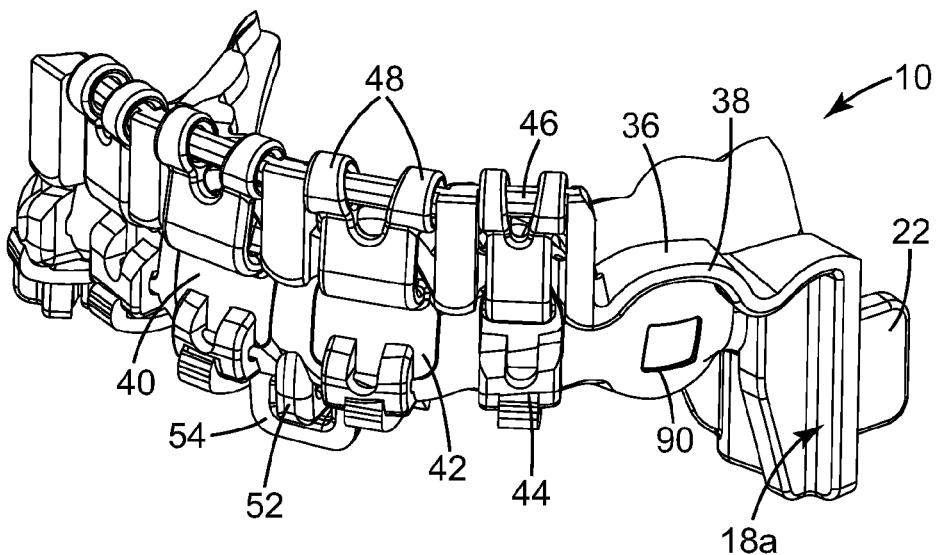
FIG. 9 is a perspective view of the custom tool of FIG. 8b.
Figure 10:
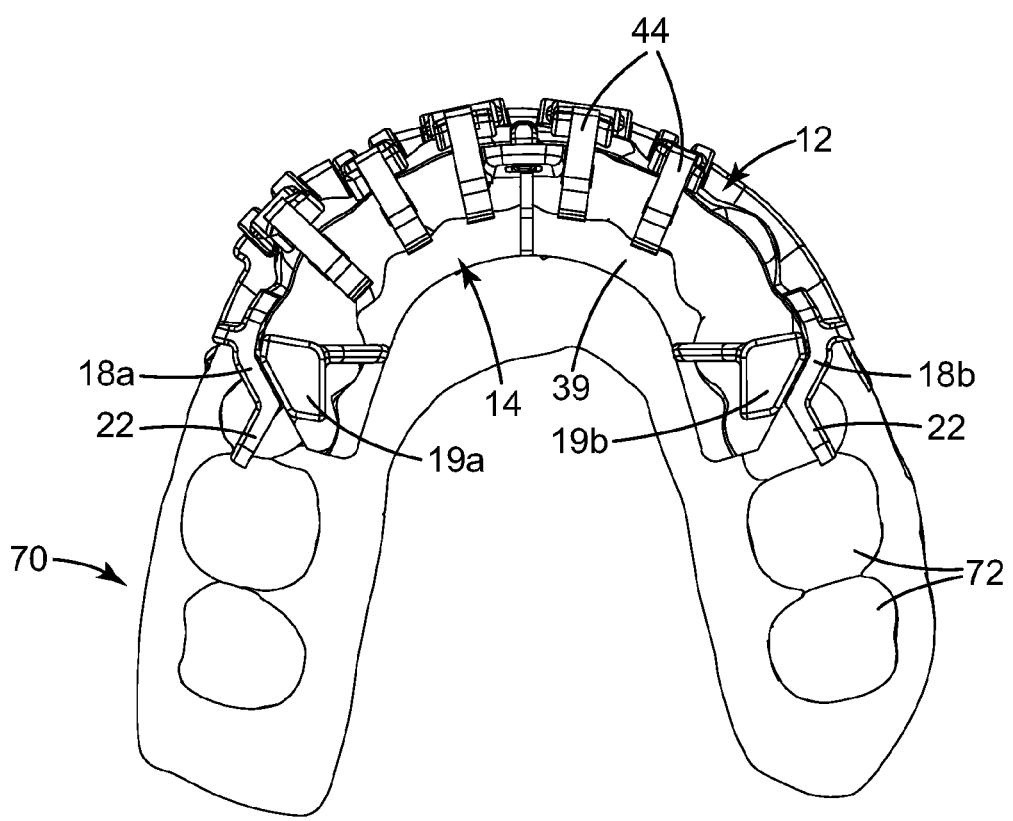
FIG. 10 is a bottom view of the custom tool of FIG. 9 in the mouth of a dental patient.

FIG. 9 illustrates the facial and lingual bodies 12, 14 fitted together. FIG. 10 illustrates the custom dental tool 10 clamped appropriately around the patient's teeth 72 in the mouth 70 of the patient. The first engagement portions 18a, 19a of the facial and lingual bodies 12, 14 are interlocked together within the mouth, offset from the occlusal surfaces of the premolars and extending the direction of the patient's tongue (not shown). Similarly, the second engagement portions 18b, 19b of the facial and lingual bodies 12, 14 are interlocked. In the illustrated embodiment, the patient is having orthodontic appliances 80 bonded to six teeth.

Figure 11A:
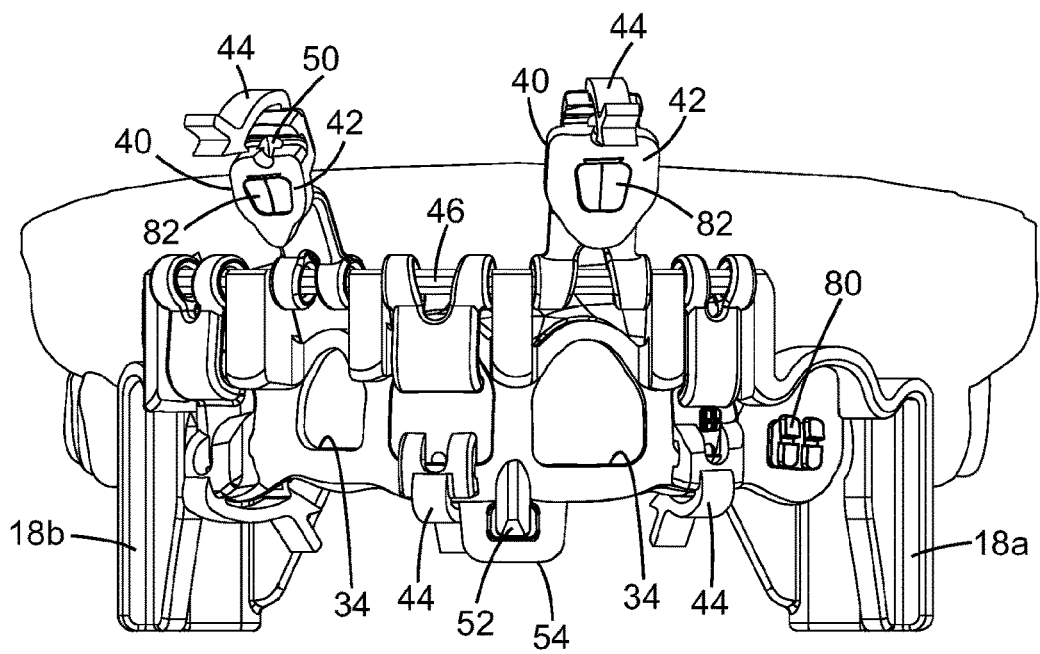
FIGS. 11a-11c illustrate example steps for using the tool of FIG. 9 to position and bond orthodontic appliances in the mouth of the orthodontic patient.
Figure 11B:
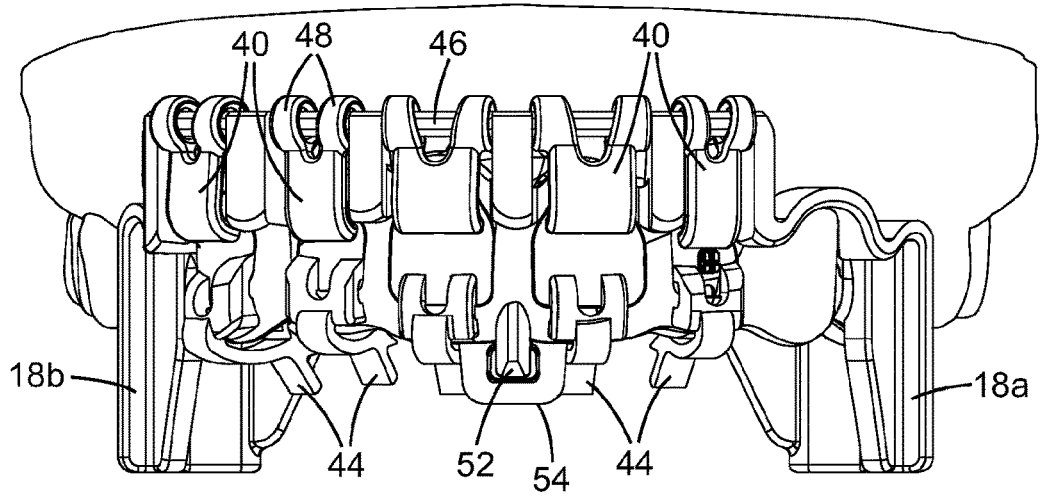
Figure 11C:
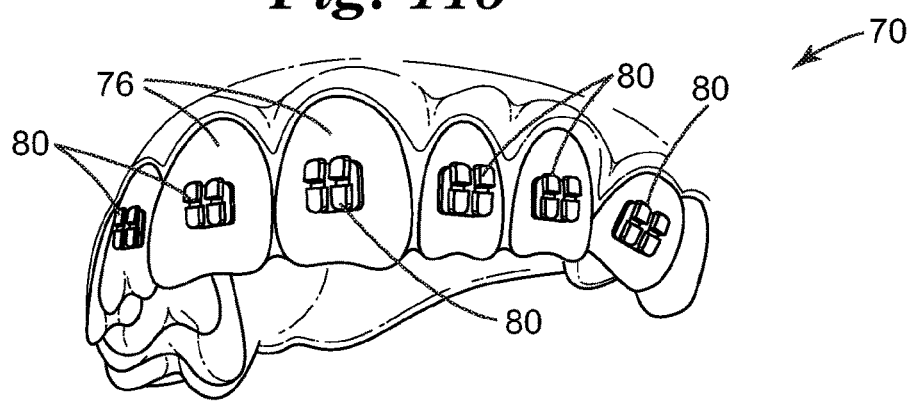

FIGS. 11a-11c are convenient for illustrating the method steps for using the custom tool 10 of the present invention after the custom tool is properly applied in the patient's mouth 70. FIG. 11a illustrates some of the doors 40 opened to allow access to install an orthodontic appliance 80 into the receptacle 100. For this view, one can see the individual bases 82 of the orthodontic brackets 80. Also, the orthodontic brackets 80 are inserted into the open receptacle 90. FIGS. 11b illustrates bonding of the orthodontic brackets 80 within the custom tool 10 to the patient's teeth in the upper dental arch. FIG. 11c illustrates the teeth 72 of the patient's mouth 70 with the orthodontic brackets 80 bonded to the teeth in their ideal locations. The ideal locations for each orthodontic appliance 80 on a tooth are predetermined by the design process described in more detail below. After the bonding process, the facial and lingual bodies 12, 14 are removed from the patient's mouth by disengaging their respective engagement portions 18, 19 from each other.

During the use of a custom tool 10 for bonding orthodontic appliances 80, an adhesive is typically applied to the base 82 of each appliance 80 by the orthodontist or a staff member. Although the custom tool 10 is also useful for adhesive pre-coated orthodontic appliances. Suitable available orthodontic appliances are commercially available from 3M Company based in St. Paul. 3M Company provides ceramic orthodontic brackets commercially as 3M™ Clarity™ brackets, metal brackets commercially as Victory Series™ brackets, Unitek™ brackets, and SmartClip™ self-ligating brackets. In addition, suitable commercially available pre-coated orthodontic appliances or brackets are available from 3M Company based in St. Paul, Minn. as APC™ brackets, APC™ PLUS brackets, and APC™ Flash-Free brackets. Regardless if a coat of adhesive is applied to the bracket base or if pre-coated appliances are used, each orthodontic appliance 80 is then placed by use of the receptacle 90, 100 to contact the adhesive layer on the base of the appliance 80 onto the patient's tooth, and it remains in place until the adhesive hardens. The receptacles 90, 100 allow the orthodontic appliances 80 to be applied at a direction generally perpendicular to the surface of the tooth, and in turn, helps minimize the potential to smear, or otherwise interference with, adhesives applied to the teeth during bonding. This situation may be encountered, for example, when using a two-component (or A/B type) chemical cure adhesive where one adhesive component is applied to the appliance and the other component is applied to the tooth. In contrast, with prior indirect bonding trays more adhesive smearing can potentially occur on the tooth side when the resultant physical transfer tray slides onto the patient's teeth from the occlusal direction towards the gingival direction. It is generally desirable to reduce the degree of adhesive smearing, since smearing can deplete the amount of adhesive at the bonding site and thereby decrease bond reliability. Smearing can also leave an unwanted film of adhesive on portions of the teeth that are not being bonded. After removal of the custom tool 10 from the patient's teeth, the adhesive used to bond each appliance 80 to the tooth is typically retained on the base of each appliance 80, and each appliance 80 is firmly bonded in its intended location.

Figure 12:
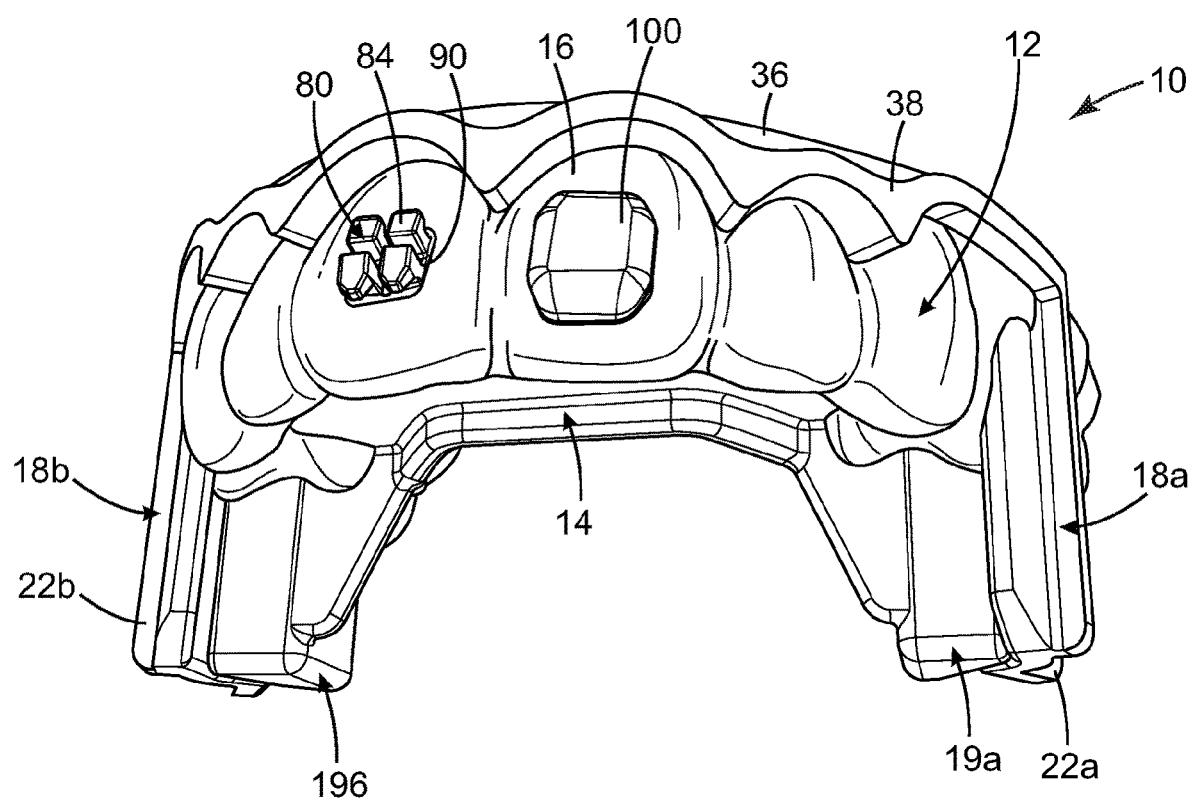
FIG. 12 is a perspective view of another embodiment of a custom tool for bonding orthodontic appliances in an orthodontic patient's mouth.

FIG. 12 illustrates another embodiment of a custom tool 10 for bonding orthodontic appliances, where the custom tool illustrates the two different types of receptacles, an open receptacle 90 and a partially enclosed receptacle 100. The open receptacle 90 has an orthodontic appliance 80 mounted within its perimeter. The enclosed receptacle 100 has an orthodontic appliance 80 mounted there in (not visible). The orthodontic appliance 80 has ties wings 84. The facial body and lingual body 12, 14 are clamped together and have the same configurations of engagement portions 18a, 18b, 19a, 19b, and release tables 22a, 22b as described in great detail above.

All the Figures illustrate a custom tool 10 having receptacles 90, 100 for assisting the orthodontist in placing and bonding the appliances 90 on the labial surface of the patient's teeth aligned with each corresponding receptacle 90, 100. However, the custom tool of the present invention may also provide lingual and facial bodies designed to assist in placing and bonding the appliances 80 on the lingual surface of the patient's teeth aligned with each corresponding receptacle 90, 100.

Different embodiments custom tool 10 for bonding orthodontic appliances may be used on a partial to full dental arch in an orthodontic patient's mouth.

Custom tools as described herein may be formed based on a digital model of the teeth and mouth of an individual patient, which can be produced from an intra-oral 3D scan, such as an intraoral scanner. In one particular example, the custom tools may be digitally designed using CAD software, such as solid modeling software based on the digital model of the planned orthodontic treatment. Custom tool was designed to fit over the teeth to receive orthodontic appliances (the appliance positioning portion) and a portion of the neighboring teeth (the engagement portions). Subsequently, the tooth structure model of the teeth may be digitally subtracted from a block to create a tool. Alternatively, an inverse of the tooth structure may be inverted within software to define the block. Engagement portions may be located in regions which correspond to regions of the teeth where they will extend from.

Within the digital model, the body block design may be segmented into two sections (facial body and lingual body) to facilitate eventual assembly of the tool components on the teeth, with specific geometric interferences selected related to the arch lengths to provide desired the clamping forces, as discussed above. Within the digital model, engagement portions with certain interlocking geometries are designed, selecting overall heights of the engagement portions based where the engagement portions are placed within the patient's mouth, as discussed in more detail above.

Within the digital model, virtual orthodontic appliances are placed at desired locations on the teeth of arch model to form a composite model. For one embodiment of the present invention, the orthodontic appliances are represented by labial brackets. In an alternative embodiment, the orthodontic appliances are represented by lingual brackets. Regardless, the orthodontic appliances including their overall shape and corresponding bases for attachment to the teeth are directly provided in the form of an STL file, or other digital image, by the appliance manufacturer. One suitable appliance manufacture is 3M Company based in St. Paul. Preferably, the orthodontic appliances are exact virtual replicas of the physical appliances to be bonded to the teeth of the patient.

The desired locations for the virtual orthodontic appliances on the teeth of the virtual dental arch model of the patient can be determined in any of a number of ways. In one example, the treating professional manually selects and places the virtual orthodontic appliances directly on the model using the local computer. In some embodiments, the modeling software treats each appliance and each tooth as a separate object within the 3D environment and fixes the position of each orthodontic appliance within the 3D space relative to a coordinate system associated with the tooth of the corresponding appliance. The modeling software can then, for example, virtually connect the virtual orthodontic appliances to a virtual arch wire selected by the practitioner and compute the final positions of the teeth based on the positions of the orthodontic appliances and the selected arch wire. The modeling software can then display the virtual teeth in their final occlusion for review by the treating professional.

If the treating professional is not entirely satisfied with the final predicted positions of the teeth, the treating professional may use the modeling software to manipulate one or more of the virtual orthodontic appliances relative to the virtual teeth. Based on these adjustments, the modeling software can again virtually connect the virtual orthodontic appliances to the virtual arch wire, for example, to simulate the movement of teeth to new final positions. The new final positions of the teeth, determined by the positions of corresponding virtual appliances, are then computed and displayed for review. These steps can be repeated as many times as desired until the treating professional is satisfied with the final positions of the teeth as represented by the modeling software. As an alternative to moving appliances, the treating professional may instead use the modeling software to define the desired positions of teeth, and have the modeling software determine the suitable locations to place the virtual orthodontic appliances in order to move the teeth to those desired positions. Examples of virtual orthodontic treatment are disclosed in issued U.S. Pat. Nos. 6,739,869 (Kopelman et al.), 7,354,268 (Raby et al.) and 7,993,133 (Cinader, Jr. et al.), all of which are hereby incorporated.

As another option, the location of the orthodontic appliances 80 may be carried out by a technician at a location remote from the treating professional's office. For example, a technician at the orthodontic appliance manufacturer's facility may use the modeling software to place orthodontic appliances on the arch model based on standards or guidelines from an orthodontic treatment philosophy, such as for example that of Drs. MacLaughlin, Bennett, and Trevisi taught in text book "Systemized Orthodontic Treatment Mechanics" 1st Edition by Richard P. McLaughlin BS DDS, John C. Bennett FDS RCS, and Hugo Trevisi DDS.

These standards or guidelines for appliance placement may be specific to each tooth in model, and call out the position of the arch wire slot (an occlusal-gingival height, for example) with respect to the clinical crown of each tooth. The technician may also place orthodontic appliances in accordance with particular instructions provided by the treating professional. Once the technician is satisfied with the orthodontic appliance positions and the resulting finished positions of the teeth, the model, together with the data representing the positions of orthodontic appliances, are transmitted to the treating professional for review. The treating professional can then either approve the technician's appliance placement positions or reposition the orthodontic appliances as desired.

As yet another option, the local computer can automatically suggest locations of orthodontic appliances on the teeth to the treating professional. Again, these proposed orthodontic appliance locations are optionally based upon an orthodontic treatment philosophy or other known standards or guidelines in the art. Examples of automatically placing virtual brackets on teeth are described in issued U.S. Pat. Nos. 7,210,929 (Raby et al.), 8,517,727 (Raby et al.) and 7,940,258 (Stark et al.), all of which are hereby incorporated by reference. As before, the treating professional has the opportunity to review the computer-proposed locations of orthodontic appliances and can either approve the placement positions or reposition the orthodontic appliances as desired.

The complete disclosures of the patents, patent documents, and publications cited herein are incorporated by reference in their entirety as if each were individually incorporated. A number of other variations, modifications and additions are also possible without departing from the spirit of the invention. Accordingly, the invention should not be deemed limited to the specific embodiments described above, but instead only by a fair scope of the claims that follow and their equivalents.

The following embodiments are intended to be illustrative of the present disclosure and not limiting.

Exemplary Embodiments

Embodiment 1 is a custom tool for bonding orthodontic appliances in a mouth of a patient, the custom tool comprising: a facial body for a patient-specific, customized fit with the facial side of a plurality of teeth of the patient, wherein the facial body includes an appliance positioning portion and a first engagement portion extending away from the appliance positioning portion; a lingual body for a patient-specific, customized fit with the lingual side of the plurality of the teeth of the patient, wherein the lingual body includes a first engagement portion; wherein the first engagement portion of the facial body interlocks with the first engagement portion of the lingual body; and wherein the facial body and lingual body are configured to combine with the teeth of the patient to position orthodontic appliances on the plurality of teeth.

Embodiment 2 is a custom tool of Embodiment 1, wherein the facial body includes a second engagement portion extending away from the appliance positioning portion, and wherein the lingual body includes a second engagement portion; and wherein the second portion of the facial body interlocks with the second portion of the lingual body.

Embodiment 3 is a custom tool of embodiment 1, wherein the facial body includes a plurality of receptacles aligned with the plurality of teeth to receive an orthodontic appliance.

Embodiment 4 is a custom tool of embodiment 3, wherein the plurality of receptacles are apertures designed to each hold an orthodontic appliance.

Embodiment 5 is a custom tool of embodiment 3, wherein the plurality of receptacles is enclosed to each hold an orthodontic appliance.

Embodiment 6 is custom tool of embodiment 5, further including a plurality of doors each having an enclosed receptacles for receiving an orthodontic appliance, wherein each door mates with a corresponding aperture positioned adjacent a tooth to receive an orthodontic appliance.

Embodiment 7 is a custom tool of embodiment 1, wherein the mouth of the patient includes an occlusal plane, and wherein the first engagement portion of the facial body and the first engagement portion of the lingual body extend generally perpendicular to the occlusal plane.

Embodiment 8 is a custom tool of embodiment 1, further including a first alignment member on the facial body and a second alignment member on the lingual body.

Embodiment 9 is custom tool of embodiment 1, wherein the first engagement portion of the facial body includes a protrusion and wherein the first engagement portion of the lingual body includes an indentation, wherein the protrusion of the facial body interlocks with the indentation of the lingual body adjacent to an occlusal plane of a patient's mouth.

Embodiment 10 is a custom tool of embodiment 1, wherein the first engagement portion of the facial body includes an indentation and wherein the first engagement portion of the lingual body includes a protrusion, wherein the protrusion of the lingual body interlocks with the indentation of the facial body adjacent to an occlusal plane of a patient's mouth.

Embodiment 11 is a custom tool of embodiment 1, wherein the first engagement portion of the facial body interlocks with the first engagement portion of the lingual body; and wherein the interlocked portions are configured to provide a clamping force between the facial body and lingual body.

Embodiment 12 is a custom tool of embodiment 1, wherein the facial body includes a plurality of receptacles aligned with the plurality of teeth, wherein each receptacle is holding an orthodontic appliance.

Embodiment 13 is a custom tool of embodiment 12, wherein the orthodontic appliance is precoated with adhesive.

Embodiment 14 is a custom tool of embodiment 1, wherein each receptable is holding an orthodontic appliance at a predetermined location and predetermined orientation on its respective tooth.

Embodiment 15 is a method of bonding orthodontic appliances in a mouth of a patient, the method comprising: positioning a patient-specific lingual body adjacent a plurality of teeth of a patient to receive orthodontic appliances, wherein the lingual body has customized fit with the lingual side of the teeth of the patient, wherein the lingual body includes a first engagement portion, and; positioning a patient-specific facial body adjacent the plurality of teeth, wherein the facial body has a customized fit with the facial side of the teeth of the patient, a first engagement portion, and a plurality of receptacles each holding an orthodontic appliance aligned with the plurality of teeth; interlocking the first engagement portion of the facial body with the first engagement portion of the lingual body to combine with the teeth of the patient to position the orthodontic appliances on the plurality of teeth; bonding the orthodontic appliances to the teeth; and removing the facial and lingual bodies from plurality of teeth.

Embodiment 16 is the method of embodiment 15, wherein the plurality of receptacles are apertures each holding an orthodontic appliance.

Embodiment 17 is the method of embodiment 15, wherein the plurality of receptacles is enclosed and holding an orthodontic appliance.

Embodiment 18 is the method of embodiment 15, wherein the bonding step include photocuring a layer of adhesive between the orthodontic appliances and the teeth.

Embodiment 19 is a method of designing a custom tool for bonding orthodontic appliances in a mouth of a patient, the method comprising: receiving, by one or more processors, three-dimensional scan data including supragingival tooth structure of a patient; designing, by the one or more processors, a custom tool for precise placement of orthodontic appliances on the patient's teeth based on the three-dimensional scan data of the supragingival tooth structure of the patient; designing, by the one or more processors, the orthodontic appliance receptacles to provide desired location and orientation of orthodontic appliances on the tooth structure of the patient; wherein the tool comprises: a facial body for a patient-specific, customized fit with the facial side of a plurality of teeth of the patient, wherein the facial body includes an orthodontic appliance positioning portion and a first engagement portion extending away from the positioning portion; a lingual body for a patient-specific, customized fit with the lingual side of the plurality of teeth of the patient, wherein the lingual body includes a first engagement portion extending away from the custom fitting portion; wherein the first engagement portion of the facial body interlocks with the first engagement portion of the lingual body; and wherein the facial body and lingual body are configured to combine with the teeth of the patient to position orthodontic appliances on the plurality of teeth.

What is claimed is:

1. A custom tool for bonding orthodontic appliances in a mouth of a patient, the custom tool comprising:
   a facial body for a patient-specific, customized fit with the facial side of a plurality of teeth of the patient, wherein the facial body includes an appliance positioning portion and a first engagement portion extending away from the appliance positioning portion;
   a lingual body for a patient-specific, customized fit with the lingual side of the plurality of the teeth of the patient, wherein the lingual body includes a first engagement portion;
   wherein the first engagement portion of the facial body interlocks with the first engagement portion of the lingual body, wherein the facial body includes a plurality of receptacles each aligned with a respective tooth, wherein each receptable is holding an orthodontic appliance configured for use in moving one or more teeth of the plurality of teeth from an initial position to a desired position; and wherein the facial body and lingual body are configured to combine with the teeth of the patient to position the orthodontic appliances on the plurality of teeth.

2. The custom tool of claim 1, wherein the facial body includes a second engagement portion extending away from the appliance positioning portion, and wherein the lingual body includes a second engagement portion; and wherein the second portion of the facial body interlocks with the second portion of the lingual body.

3. The custom tool of claim 1, wherein each of the plurality of receptacles is enclosed to hold the corresponding orthodontic appliance.

4. The custom tool of claim 3, wherein the facial body further including a plurality of doors, each door having one of the enclosed receptacles of the plurality of receptacles, wherein each door mates with a corresponding aperture positioned adjacent a respective tooth to receive the orthodontic appliance.

5. The custom tool of claim 1, wherein the mouth of the patient includes an occlusal plane, and wherein the first engagement portion of the facial body and the first engagement portion of the lingual body extend generally perpendicular to the occlusal plane.

6. The custom tool of claim 1, further including a first alignment member on the facial body and a second alignment member on the lingual body.

7. The custom tool of claim 1, wherein the first engagement portion of the facial body includes a protrusion and wherein the first engagement portion of the lingual body includes an indentation, wherein the protrusion of the facial body interlocks with the indentation of the lingual body adjacent to an occlusal plane of a patient's mouth.

8. The custom tool of claim 1, wherein the first engagement portion of the facial body includes an indentation and wherein the first engagement portion of the lingual body includes a protrusion, wherein the protrusion of the lingual body interlocks with the indentation of the facial body adjacent to an occlusal plane of a patient's mouth.

9. The custom tool of claim 1, wherein the first engagement portion of the facial body interlocks with the first engagement portion of the lingual body; and wherein the interlocked portions are configured to provide a clamping force between the facial body and lingual body.

10. The custom tool of claim 1, wherein the orthodontic appliance is precoated with adhesive.

11. The custom tool of claim 1, wherein each receptable is holding an orthodontic appliance at a predetermined location and predetermined orientation on its respective tooth.

12. The custom tool of claim 1, wherein each orthodontic appliance is an orthodontic bracket.

13. The custom tool of claim 12, wherein the orthodontic bracket is precoated with adhesive.

14. The custom tool of claim 12, wherein each receptacle is holding the orthodontic bracket at a predetermined location and predetermined orientation on its respective tooth.

\* \* \* \* \*